United States Patent [19]

Means

[11] Patent Number: 4,813,167

[45] Date of Patent: Mar. 21, 1989

[54] VEHICLE PLATE ATTACHMENT METHOD AND APPARATUS THEREFOR

[76] Inventor: Bob D. Means, P.O. Box 1461, Norfolk, Nebr. 68701

[21] Appl. No.: 51,903

[22] Filed: May 19, 1987

[51] Int. Cl.[4] .................................................. G09F 7/00
[52] U.S. Cl. ...................................... 40/210; 411/508; 411/512; 240/108; 240/453; 240/662; 240/619; 403/407.1
[58] Field of Search ............... 411/508, 512, 384, 397; 40/210, 209, 200; 24/108, 453, 662, 694, 614, 619, 697; 296/1 C; 403/407.1

[56] References Cited

U.S. PATENT DOCUMENTS

| | | | |
|---|---|---|---|
| 1,176,619 | 3/1916 | Sykes. | |
| 1,481,784 | 1/1924 | Warner | 24/694 |
| 1,767,805 | 6/1930 | Maynard | 24/694 X |
| 1,856,814 | 5/1932 | Jones | 24/694 X |
| 1,877,075 | 9/1932 | Stephenson | 40/209 |
| 1,879,906 | 9/1932 | Linstrom | 40/209 |
| 1,999,344 | 4/1935 | Simpson | 40/125 |
| 2,066,694 | 1/1937 | Padavic, Jr. | 40/125 |
| 2,123,935 | 7/1938 | Dole | 24/230 |
| 3,551,963 | 1/1971 | Mosher, Jr. et al. | 411/512 X |
| 3,683,529 | 8/1972 | Reed | 40/209 |
| 3,836,703 | 9/1974 | Coules | 174/138 D |
| 4,011,675 | 3/1977 | Herring | 40/209 |
| 4,445,291 | 5/1984 | Easley | 40/210 |

FOREIGN PATENT DOCUMENTS

| | | | |
|---|---|---|---|
| 540747 | 9/1955 | Belgium | 40/209 |
| 560154 | 7/1958 | Canada | 24/662 |
| 2632538 | 1/1978 | Fed. Rep. of Germany | 40/209 |
| 142650 | 8/1977 | Japan | 174/138 D |
| 2029888 | 3/1980 | United Kingdom | 24/108 |

*Primary Examiner*—Lloyd A. Gall
*Assistant Examiner*—Curtis B. Brueske
*Attorney, Agent, or Firm*—Kinney & Lange

[57] ABSTRACT

An improved method for fastening a license plate or a cover plate for a license plate to a vehicle and apparatus therefor includes use of a plurality of two-part separable fasteners. A first part of each fastener is secured to, or actually comprises, the head of each of the bolts which are provided to hold the license plate to the vehicle. The second part of each fastener is secured to a back side of the plate to be secured to the vehicle and positioned to mate with its respective first part in a friction-fit relation. When a cover plate for a license plate is so mounted, it is placed in an overlying relation with respect to the license plate.

13 Claims, 1 Drawing Sheet

VEHICLE PLATE ATTACHMENT METHOD AND APPARATUS THEREFOR

BACKGROUND OF THE INVENTION

1. Field of the Invention.

The present invention relates to an apparatus and method for removably fastening an identification plate to a vehicle.

2. Description of the Prior Art.

In some instances, it is desirable to secure a cover plate over a vehicle's existing license plat. It is preferable that such a cover plate be easily mounted and removed to overlie the existing license plate of a vehicle. The type of instance where this arrangement is desired is for showing classic cars in parades or at auto shows. A regulation license plate may be required to drive the vehicle on government highways, but a "show plate" would be placed on the vehicle when on exhibition or in a parade. Such a show plate might indicate such information as the vehicle's year of manufacture, make and/or owner's name and address.

Another application for a quickly removable arrangement for a cover plate or basic license plate for a vehicle is in connection with vehicle sales. For example, when each vehicle is test driven, it typically must bear a government-issued license plate, and it would be advantageous to be able to quickly move a single license plate from vehicle to vehicle to allow for customer test driving.

Prior arrangements for temporarily mounting license plates or vehicle identification plates include those shown in U.S. Pat. No. 4,011,675 granted to Herring on Mar. 15, 1977 and U.S. Pat. No. 3,683,529 granted to Reed on Aug. 15, 1972. The Herring patent shows a removable license plate holder designed to provide for quick removal of the license plate itself without first removing the holder from the plate. The distal ends of the mounting bolts in the Herring device are pivoted to engage the vehicle and retain the holder thereon. The Reed patent shows a holder for license plates and signs which has a magnetic back so that it can be mounted to any metallic surface of a vehicle. The use of magnetic signs can mar the paint finish of a vehicle, however. Another way for mounting an informational sign to a show vehicle is to tape the sign to the vehicle or tape it in a window of the vehicle. Again, this is unsuitable because it not only may mar the finish of the vehicle, but also detracts from the vehicle's appearance on exhibition.

U.S. Pat. No. 2,123,935 granted to Dole on July 19, 1938 shows a separable fastener adapted to be used for securing an automobile license plate to a carrying bracket. The fastener in this case is a complicated spring loaded arrangement which must be released by using a specially designed key in order to separate the fastener portions. Such an arrangement would simply not be suitable in terms of ease and efficiency for permitting quick removal and replacement of an identification plate.

SUMMARY OF THE INVENTION

The present invention overcomes the disadvantages of the known prior art by providing a readily attachable and removable arrangement for an identification plate on a vehicle. The present invention is easy to use, and requires no special tools.

The present invention provides a method and apparatus for removably fastening a license plate or a cover for a license plate to a vehicle. The apparatus includes a plurality of fasteners, with each fastener having first and second separable parts. The first part of each fastener is mounted on the vehicle and the second part of each fastener is secured with respect to the back side of the plate which is being fastened to the vehicle, with each of the second parts in position to mate with a respective one of the first parts and thus secure the plate to the vehicle. When a cover plate is being mounted over an already secured license plate, the cover plate is fastened in an overlying relation with respect to the license plate.

License plates are typically secured via a plurality of bolts. Preferably, each fastener of the present invention is a friction-fit fastener and the head of each bolt which is used for fastening constitutes the first part thereof. In a friction fit fastener arrangement, one part of the fastener is a male connector and the other part is a female connector. In one embodiment of the invention, the cover plate is transparent to permit viewing of the underlying license plate. In another embodiment, the cover plate is opaque and provides a separate means for providing identification relating to the vehicle.

To use the method of the present invention for removably securing a license plate or a cover plate therefor to a vehicle, the steps include first mounting a first part of each of a plurality of two-part separable fasteners to the vehicle in a generally coplanar relation. The method includes mounting a second part of each two-part separable fastener with respect to a back side of the plate which is being secured to the vehicle, with the second parts in alignment with respect to each of the first parts mounted on the vehicle. The method of securing is completed by urging the first and second parts of each two-part fastener into a coupled relation.

DETAILED DESCRIPTION OF THE PREFERRED EMBODIMENTS

Figure 1:
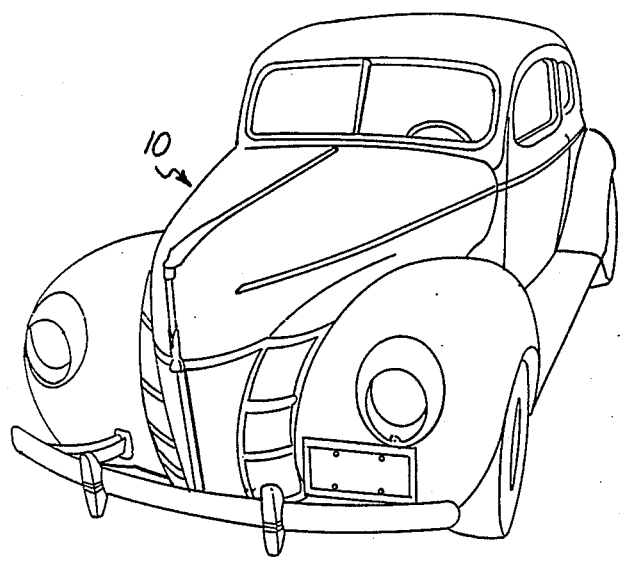
FIG. 1 shows an automobile bearing a license plate cover of the present invention.
Figure 2:
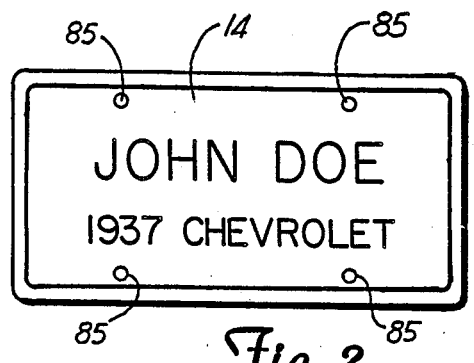
FIG. 2 shows a front plan view of a license plate cover of the present invention.

A vehicle 10 is shown in FIG. 1 with a license plate mounted in a typical location 12 on a front end thereof. In the usual manner, license plates are mounted on the front and rear ends of a vehicle to provide a coded identification of the vehicle and its owner. In the case of vehicle 10 shown in FIG. 1, which depicts a classic car such as a 1937 Chevrolet, it is sometimes useful for the purpose of parades or outo shows to provide identification information for the vehicle which is not included in the government issued license plate. For example, FIG. 2 shows a sample identification plate 14 which is mountable on a vehicle 10 and provides such information as the name of the vehicle's owner and the year and make of the vehicle.

The present invention provides a method and apparatus for easily affixing a license plate or a removable cover plate therefor to a vehicle. In the case of a cover plate such as that shown in FIG. 2, this permits the easy and quick mounting and removal of such a cover plate. Thus, when a classic car such as vehicle 10 is driven on the street or highway, the government issued license plate will be visible, and when driven in a parade or exhibited at a show, the cover plate (which is opaque as shown in FIG. 2) can be mounted to provide different identifying information for the vehicle.

Figure 5:
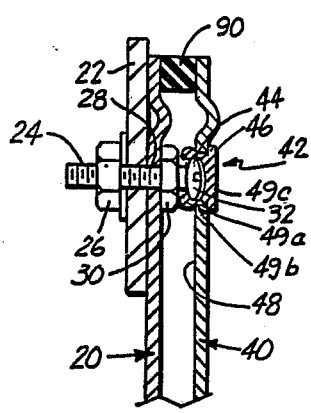
FIG. 5 shows in an enlarged section, another embodiment of the mounting means of the present invention in vertical section, wherein both a license plate and a cover for the license plate are attached by means of the present invention.
Figure 5:
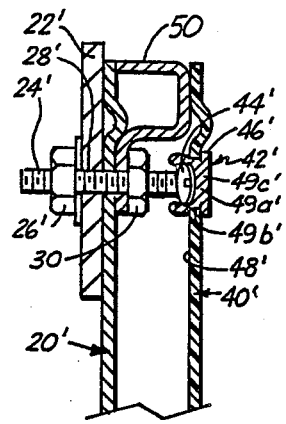
Figure 5:
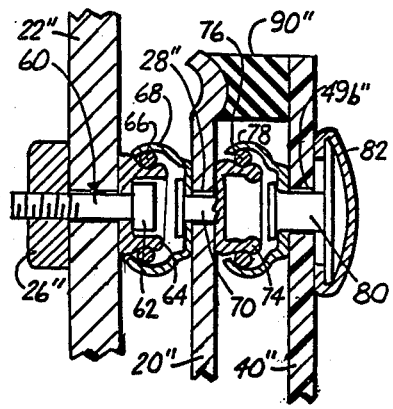
Figure 3:
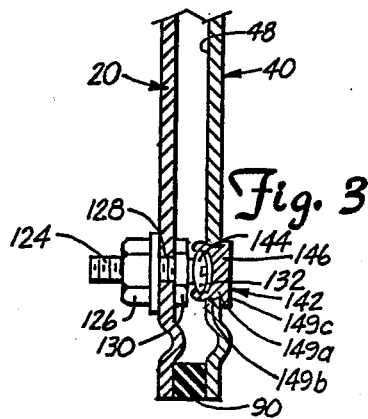
FIG. 3 shows the mounting means of the present invention in vertical section.
Figure 4:
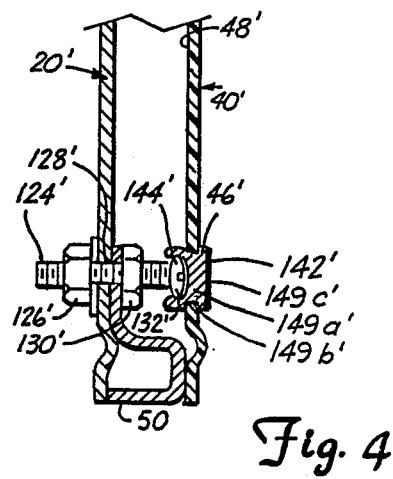
FIG. 4 shows another embodiment of the mounting means of the present invention in vertical section.

The apparatus developed for providing a quick mounting and removal scheme for such vehicle identification plates and covers therefor is perhaps best seen in FIGS. 3–5. FIG. 3 shows a license plate 20 mounted to a vehicle via vehicle mounting bracket 22. As is typical, the license plate 20 is mounted by means of one or more bolts 24, each of which is either threadably engaged by the mounting bracket 22 or by a nut 26 behind the bracket 22 which may or may not be affixed to the bracket 22. In either event, bolt 24 is inserted into a hole 28 in the license plate 20 and then placed in threaded engagement with respect to the mounting bracket 22 or nut 26. A front nut 30 is threadably mounted on the bolt 24 and is tightened toward the mounting bracket to engage and hold the license plate 20 against the mounting bracket 22. The head 32 of the bolt 24 thus extends outward and is spaced from the front nut 30 and front side of license plate 20. In some instances, the license plate 20 may only be affixed to the vehicle by two bolts 24 which are aligned along either the top or bottom of the license plate 20. All license plates are usually provided with four holes for bolts, however, as can be seen in FIGS. 1 and 2.

A cover plate 40 is seen in FIG. 3 mounted in a generally parallel, overlying relation to the license plate 20. As seen in the upper portion of FIG. 3, the cover plate 40 is secured to the mounting bracket 22 of the vehicle by means of a plurality of two-part separable fasteners 42. In a preferred embodiment, each of those fasteners 42 are snap fasteners including separable male and female portions 44 and 46, respectively. The male portion 44 is mounted on the head 32 of each bolt 24 or may itself constitute the head 32, as seen in FIG. 3. The female portion 46 is secured to a back side 48 of the cover plate 40 and is mounted to the cover plate 40 in alignment to mate with the male portion 44 when the cover plate 40 is placed in an overlying relation with respect to the license plate 20. The female portion 46 is secured to the cover plate 40 by any suitable manner. In FIG. 3, the female portion 46 is connected by a post 49a (which extends through hole 49b in the cover plate 40) to a button head 49c.

In the lower portion of FIG. 3, a corresponding fastening arrangement for the license plate and cover plate is shown. This arrangement is shown with the fastening components bearing reference numbers one hundred higher than those discussed above (e.g., bolt 124 corresponds to bolt 24, nut 126 to nut 26, etc.). This lower arrangement in FIG. 3 depicts the fastening scheme at another portion of the license plate 20 involving bolt 124, which may or may not be mounted directly to the vehicle via a mounting bracket 22 or other means. The means of securing the cover plate 40 to the license plate 20 remains the same, as illustrated.

FIG. 4 shows a variation of the arrangement seen in FIG. 3. In the embodiment of the present invention seen in FIG. 4, those components or features which are the same, similar to or correspond with those of the embodiment shown in FIG. 3 are referenced by the same reference numeral with a prime mark. In FIG. 4, a license plate mounting bracket 50 is secured between the front nuts 30', 130' and the license plate 20'. Because of the depth of the edges of the bracket 50, the cover plate 40' cannot be mounted in close parallel alignment to the license plate 20'. The bolts 24', 124' thus are longer and are mounted by an adjustment of the front nuts 30', 130' to extend outwardly from the front of the license plate 20' a sufficient depth to allow the cover plate 40' to be secured thereto, via the two-part separable fasteners 42', 142', in position to overlie the bracket 50 and license plate 20'. The means of attaching the cover plate 40' to the license plate 20 is, except for the spacing between the two, otherwise the same as seen in FIG. 3.

FIG. 5 shows a more detailed fastener arrangement, and also illustrates the ability not only to fasten a cover plate to a vehicle by the apparatus and method of the present invention, but also that the vehicle's license plate may be so fastened as well. In the embodiment of the present invention seen in FIG. 5, those components or features which are the same, similar to or correspond with those of the embodiments seen in FIGS. 3 and 4 are referenced by the same reference numerals, with a double prime mark. In FIG. 5, the standard bolt 24' is replaced with an elongated fastener 60 which has a threaded end engageable in the mounting bracket 22" or a nut 26". The fastener 60 has a head 62 about which is concentrically mounted a male snap section 64, configured to frictionably mate with a snap ring 66 retained within a female cap portion 68.

The female cap portion 68 is, in turn, secured to the back side of the license plate 20". The female portion 68 is mounted to the license plate via engagement with a stud 70 which passes through hole 28" in the license plate 20" and is connected to another male portion 74. The license plate is thus removably securable to the mounting bracket 22" of the vehicle by means of the coupling and separation of the male portion 64 and female portion 68 of each of the fasteners. The male portion 74 is provided for removably mounting a cover plate 40" over the license plate 20". The male portion 74 is positioned on a front side of the license plate 20" and configured to align with a snap ring 76 which is retained in a female cap portion 78.

The female cap portion 78 is, in turn, secured to the back side of the cover plate 40". The female portion 78 is mounted to the cover plate 40" via engagement with stud 80 which passes through hole 49b' in the cover plate 40" and is connected to a snap head 82 on the front side of the cover plate 40". For appearances sake, the snap head 82 is preferably chrome plated. Preferably, this type of fastening arrangement is provided at four locations about the edges of the license and cover plates, aligned generally as indicated at 85 in FIG. 2.

If it is desired that the license plate 20" be visible, yet protected from the elements, the cover plate 40" is formed of transparent material. In addition, an edge sealing ring such as ring or 90" seen in FIGS. 3 and 5, respectively, can be positioned between the cover plate and license plate to prevent foreign matter from entering the space between the two plates. Th edge ring or 90" can be made of resilient rubber or other suitable material to adapt to variations in the surfaces of the two plates as they are secured together, and can be affixed to the back side of the cover plate adjacent its edge.

In operation, a license plate or cover plate therefor is mountable to a vehicle by first mounting a plurality of separable fasteners with respect to the vehicle. Each fastener has a male portion secured with respect to the vehicle in a generally coplanar relation and a female portion mounted to a back side of the plate. Each female portion is in generally coplanar relation and is in alignment to mate with the male portions which are mounted on the vehicle. The mounting procedure is completed by urging the male and female portions together into a frictionally coupled relation. In the embodiments shown above, a snap ring configuration is contemplated as seen in FIG. 5. However, other two-part separable fastener configurations may work equally as well. Separation of the fastener portions then releases the plate being mounted from its secured position, either to display the plate underneath or to allow for a different plate to be secured to the vehicle.

Although the present invention has been described with reference to preferred embodiments, workers skilled in the art will recognize that changes may be made in form and detail without departing from the spirit and scope of the invention.

What is claimed is:

1. An apparatus for removably fastening a cover plate over a vehicle's existing license plate, the apparatus comprising:
   (1) a plurality of license plate fastening bolts for threadably securing a license plate to a vehicle so that an outer side of the license plate is visible, with each bolt having a head portion that extends from the outer side of the license plate and that is formed to be a male portion of a friction-fit fastener; and
   (2) a cover plate as large as the license plate and having a plurality of female portions of friction-fit fasteners extending from a back side thereof, with the female portions aligned to frictionally mate with the male portions and thereby retain the cover plate in a parallel relation overlying the entire outer side of the license plate.

2. The apparatus of claim 1 wherein the cover plate is transparent.

3. The apparatus of claim 1 wherein the cover plate is opaque and has a front side bearing identification of the vehicle and/or its owner.

4. The apparatus of claim 1 and further comprising:
   a resilient edge sealing ring secured to the cover plate about its periphery, the sealing ring being positioned between the cover plate and license plate when the cover plate is secured over the license plate and compressed therebetween to form, in combination with the cover plate, a relatively dust-tight seal for the license plate.

5. The apparatus of claim 4 wherein the edge sealing ring is affixed to the back side of the cover plate.

6. A method of removably securing a cover plate over an existing vehicle license plate, the method comprising the steps of:
   (1) mounting a license plate to a vehicle with a plurality of license plate bolts;
   (2) forming a first part of a two-part separable fastener from a head of each one of the license plate bolts;
   (3) mounting a second part of each fastener onto a back side of a cover plate in alignment with a respective one of the first parts when the cover plate is in an overlying relation with respect to the license plate with the cover plate as large as the license plate; and
   (4) urging the first and second parts of each fastener into a coupled relation whereby the cover plate completely overlies the license plate.

7. The method of claim 6 wherein each fastener is a friction-fit fastener, with the first part thereof being a male connector and the second part thereof being a female connector configured to frictionably mate with the male connector in a securing relation.

8. The method of claim 6 wherein the cover plate is transparent, and further comprising the step of:
   compressing a resilient edge sealing ring between peripheral edges of the license plate and cover plate to form, in combination with the cover plate, a relatively dust-tight seal over the license plate.

9. The method of claim 6 wherein the cover plate is opaque and has a front side bearing identification of the vehicle and/or its owner, and further comprising the step of:
   compressing a resilient edge sealing ring between peripheral edges of the license plate and cover plate to form, in combination with the cover plate, a relatively dust-tight seal over the license plate.

10. An assembly for detachably mounting a vehicle identification plate and cover plate therefor to a vehicle, the assembly comprising:
    (1) a plurality of bolts secured to a vehicle, with each bolt having a head portion that extends out from the vehicle and that is formed to be a male portion of a first friction-fit fastener;
    (2) a vehicle identification plate having a front indicia-bearing side and a back side;
    (3) front and back fastener means on the vehicle identification plate, the fastener means including:
        (a) a plurality of female portions of the first friction-fit fastener extending from the back side of the vehicle identification plate, with the female portions of the first fasteners being aligned to frictionally mate with the male portions of the first fasteners and thereby secure the vehicle identification plate to the vehicle with its front side visible, and
        (b) a male portion of a second friction-fit fastener that is mounted to each female portion of the first fastener and that extends out from the front side of the vehicle identification plate; and
    (4) a transparent cover plate as large as the vehicle identification plate and having a plurality of female portions of the second friction-fit fastener extending from one side thereof, with the female portions of the second fastener being aligned to frictionally mate with the male portions of the second fastener and thereby retain the transparent cover plate in a parallel relation overlying the entire front side of the vehicle identification plate.

11. The apparatus of claim 10, and further comprising:
    a resilient sealing ring secured to the cover plate about its periphery, the sealing ring being positioned between the cover plate and vehicle identification plate when the cover plate is secured over the vehicle identification plate and compressed therebetween to form in combination with the cover plate, a relatively dust-tight seal over the vehicle identification plate.

12. A method of removably securing a license plate and cover plate therefor to a vehicle comprising the steps of:

(1) mounting a first part of each of a plurality of first two-part separable fasteners to a vehicle in a generally coplanar relation;
(2) mounting a second part of each first fastener to a back side of a license plate in a generally coplanar relation and in alignment to mate with the first parts of the first fasteners mounted on the vehicle so that a front side of the license plate is visible;
(3) urging the first and second parts of each first fastener into a coupled relation;
(4) mounting a first part of each of a plurality of second two-part separable fasteners to each of the second parts of the first fasteners in a generally coplanar relation so that each first part of the second fastener extends from the front side of the license plate;
(5) mounting a second part of each second fastener to one side of a transparent cover plate which is as large as the license plate, with the second parts of the second fasteners being in a generally coplanar relation and in alignment to mate with the first parts of the second fasteners mounted on the license plate; and
(6) urging the first and second parts of each second fastener into a coupled relation.

13. The method of claim 12, and further comprising the step of:
compressing a resilient edge sealing ring between peripheral edges of the license plate and cover plate to form, in combination with the cover plate, a relatively dust-tight seal for the license plate.

* * * * *

UNITED STATES PATENT AND TRADEMARK OFFICE
CERTIFICATE OF CORRECTION

PATENT NO. : 4,813,167
DATED : March 21, 1989
INVENTOR(S) : Bob D. Means

It is certified that error appears in the above-identified patent and that said Letters Patent is hereby corrected as shown below:

Column 6, line 63, after "form", insert a comma

Signed and Sealed this

Twenty-first Day of August, 1990

Attest:

HARRY F. MANBECK, JR.

*Attesting Officer*     *Commissioner of Patents and Trademarks*